(12) United States Patent
Lävemann et al.

(10) Patent No.: US 7,021,608 B2
(45) Date of Patent: Apr. 4, 2006

(54) DISTRIBUTOR FOR MICRO-QUANTITIES OF LIQUID

(75) Inventors: Eberhard Lävemann, c/o ZAE Bayern, Walther-Meissner-Str. 6, 85748 Garching/Mü (DE); Matthias Peltzer, Kurfürststr 33, 80801 München (DE)

(73) Assignees: Eberhard Lavemann, Gröbenzell (DE); Matthias Peltzer, Munich (DE)

( * ) Notice: Subject to any disclaimer, the term of this patent is extended or adjusted under 35 U.S.C. 154(b) by 42 days.

(21) Appl. No.: 10/486,822

(22) PCT Filed: Aug. 23, 2002

(86) PCT No.: PCT/EP02/09458

§ 371 (c)(1), (2), (4) Date: Feb. 19, 2004

(87) PCT Pub. No.: WO03/019097

PCT Pub. Date: Mar. 6, 2003

(65) Prior Publication Data
US 2004/0195708 A1 Oct. 7, 2004

(30) Foreign Application Priority Data
Aug. 24, 2001 (DE) .............................. 101 41 526

(51) Int. Cl.
*B01F 3/04* (2006.01)

(52) U.S. Cl. ...................... 261/23.1; 261/97; 261/110; 261/112.1

(58) Field of Classification Search ............... 261/23.1, 261/97, 103, 106, 110, 112.1, 112.2
See application file for complete search history.

(56) References Cited

U.S. PATENT DOCUMENTS

| | | | |
|---|---|---|---|
| 2,490,080 A * | 12/1949 | Melvill | 261/110 |
| 5,250,234 A * | 10/1993 | Meyer et al. | 261/97 |
| 5,354,460 A | 10/1994 | Kearney et al. | |
| 5,439,620 A * | 8/1995 | Maeda | 261/97 |
| 6,367,782 B1 * | 4/2002 | Guetersloh | 261/106 |
| 6,450,485 B1 * | 9/2002 | Harrison et al. | 261/106 |
| 2003/0111744 A1* | 6/2003 | Manteufel | 261/94 |

FOREIGN PATENT DOCUMENTS

| | | |
|---|---|---|
| DE | 43 12 743 A1 | 3/1994 |
| DE | 100 51 523 1 | 5/2001 |
| FR | 978800 | 4/1951 |

* cited by examiner

*Primary Examiner*—Scott Bushey
(74) *Attorney, Agent, or Firm*—Posz Law Group, PLC

(57) ABSTRACT

An ultra low flow liquid distributor generates a very thin yet continuous liquid film over the entire width of a transfer surface. The ultra low flow liquid distributor includes a liquid supply system starting from a common main supply, which is split by repetitive bifurcations into a multitude of liquid sub-mains, until eventually each liquid supply sub-main feeds into one of the many liquid outlet openings. In this the liquid outlet openings are arranged above the liquid supply system, which automatically ensures self-priming.

12 Claims, 7 Drawing Sheets

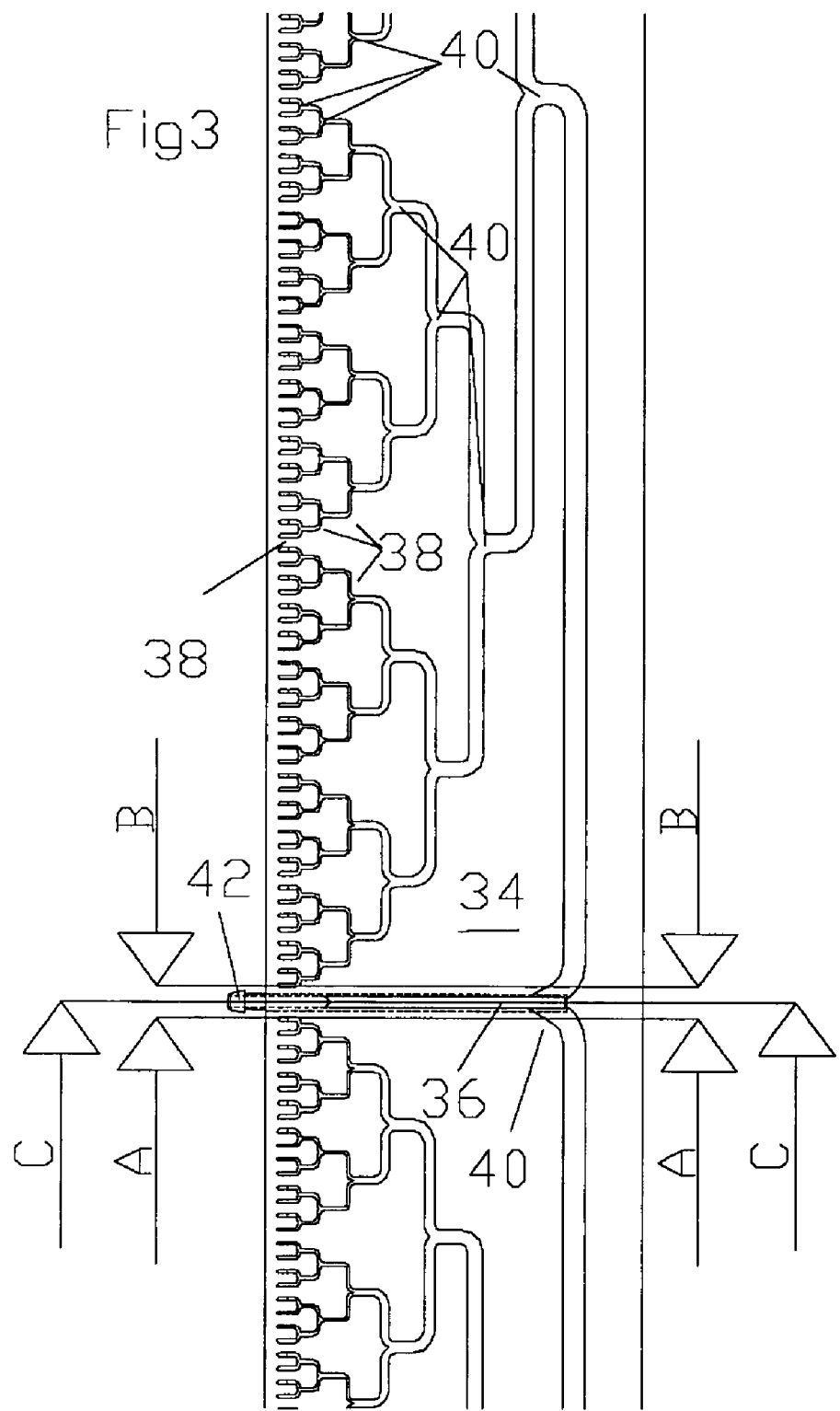

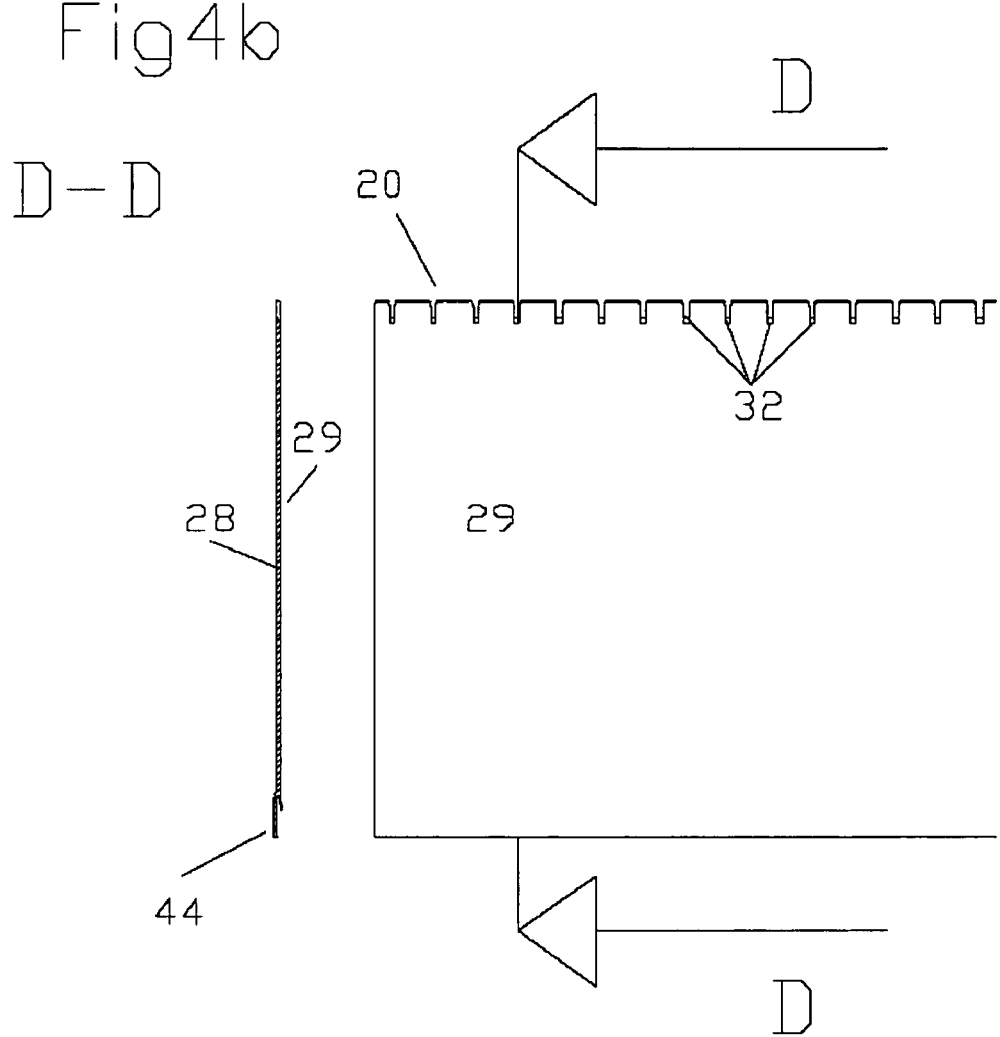

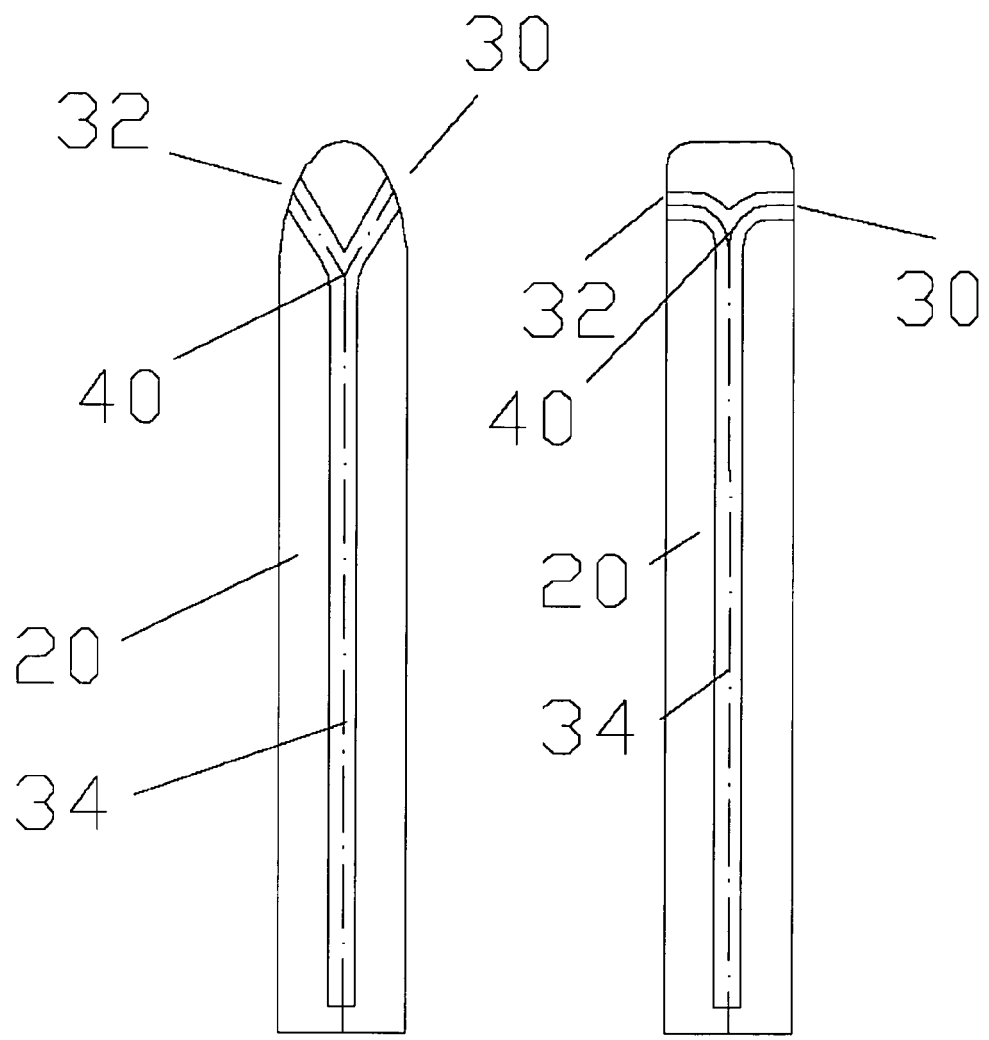

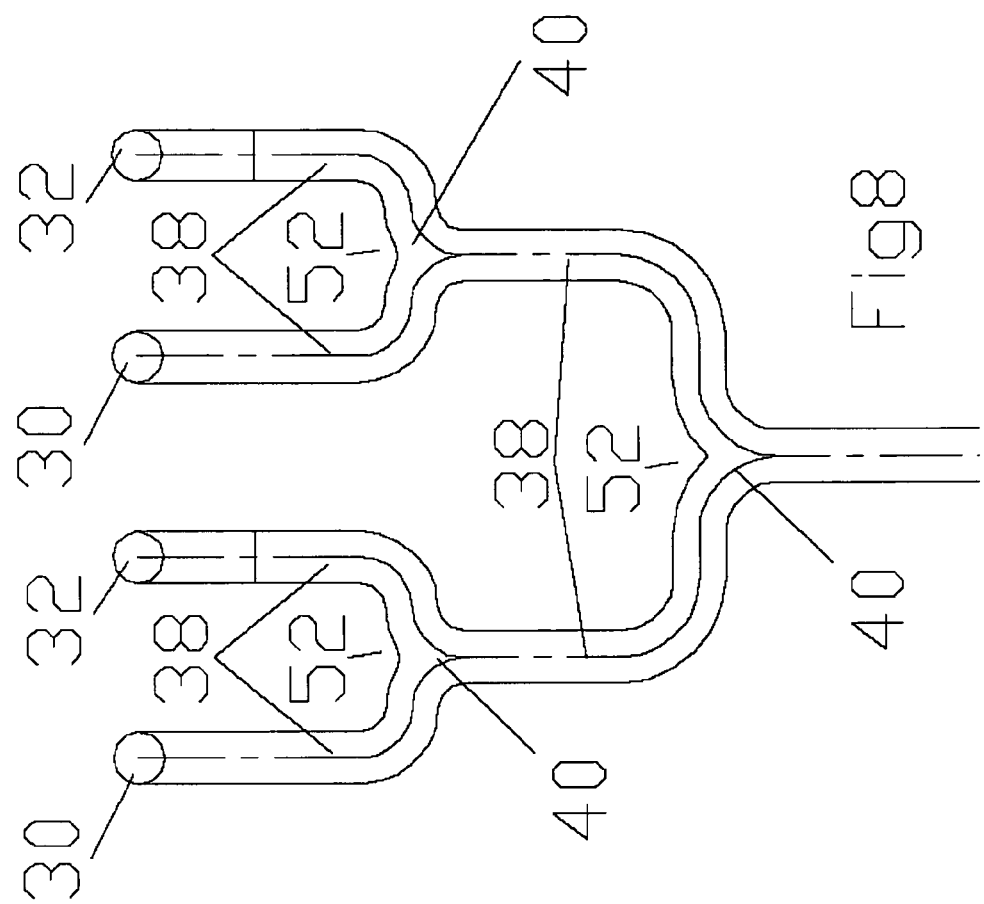

DISTRIBUTOR FOR MICRO-QUANTITIES OF LIQUID

TECHNICAL FIELD

This invention concerns an ultra low flow liquid distributor to generate a thin film of liquid on a surface, which is to be moistened.

BACKGROUND

When dispersing liquids on transfer surfaces of gas/liquid contact reactors, e.g. of plate transfer reactors, the liquids are usually sprinkled or sprayed on using appropriate devices (sprinklers, nozzles, jets, droplet distributors, etc.)

Devices with open or closed trays or ducts in connection with overflows and/or liquid outlet openings are used as well.

For example, from DE-OS 43 21 743 a liquid distribution device is known, with which a liquid is dripped onto a non-woven fabric from a porous tube. Also known from this document is the use of spray distribution devices.

From DE 36 40 886 C1 a liquid distributor for mass and heat transfer columns is known, which consists of one main distribution device with parallel ducts in the form of trays, in which the sidewalls of the trays are perforated to release the liquid. In longitudinal direction along the outside of the walls of the channels, guiding metal fins are affixed, which on the one hand encompass the perforations with recesses from below and thus exercise a centering effect on the liquid This has a centering effect on the liquid flowing down the sidewalls of the trays while the guiding fins on the other hand have cut-outs that are downward offset to the recesses and which guide the liquid to dripping tongues lying in between.

With these conventional liquid distributors the risk of droplet formation arises and with that the associated risk of small droplets being carried out by the gas flow and consequently their discharge out of the reactor. Therefore these conventional liquid distributors require demisters downstream in the gas flow, which cause additional cost.

To distribute very small amounts of liquid so-called thin film evaporators or thin film absorbers are known, in which a mechanical wiper disperses a thin film of liquid onto a transfer surface. This design requires considerable effort with regard to construction, involves numerous moving parts and is therefore expensive, prone to malfunction and requires high maintenance.

Designs with open or closed trays or ducts in connection with overflows and/or outlet openings bear the risk of silting up and clogging, respectively. In the particular application as air dehumidifiers (absorbers) for air conditioning systems it was to this date not economically feasible, to disperse the physically required lowest possible mass flow of liquid (adsorbent, usually a concentrated salt solution), which is required for the absorption of water vapour from the air, in such a way onto the mass transfer surfaces of an appropriate reactor, that an extremely thin, yet continuous film of liquid could cause a significant concentration change in the liquid (sorbent).

SUMMARY OF THE INVENTION

Therefore it is the task of the invention described herein to outline an ultra low flow liquid distributor for minimum amounts of liquids which generates a thinnest possible liquid film across the entire width of a transfer surface. Furthermore it is the task of this invention, to outline a mass- and heat transfer reactor with such an ultra low flow liquid distributor.

A specially shaped duct system, which is formed by the bisection at the bifurcations and the regularly arranged outlet openings, allows the dispersion of minimum amounts of liquid evenly without any supporting mechanical device, with regard to location as well quantity. By arranging the outlet openings above the liquid supply sub-mains, gas bubbles can easily escape, in particular during the start up of the ultra low flow liquid distributor. With the ultra low flow liquid distributor in accordance with this invention, mass transfer reactors can be built, in which extremely little liquid (sorbent) is used on a large, moistened mass transfer surface, so that the ratio between gas mass flow and liquid mass flow can be >50. The ultra low flow liquid distributor in accordance with this invention can be installed directly on the surface, which is to be moistened, so that free droplets cannot form. An additional demister is therefore not required.

In accordance with an advantageous design of this invention, the outlet openings are arranged in equal distance along the surface, which is to be moistened. This results in the even distribution of the liquid and establishes a homogenous and continuous thin liquid film.

In accordance with an advantageous design, the ducting is designed in such way that the fluid-flow in the liquid supply sub-mains is directed from bottom to top, against the gravity. This effects a self-priming of the liquid supply system during operation and during re-start after starvation of the distributor. This prevents the disturbance of the liquid flow by gas bubbles in the liquid supply sub-mains and consequently the disturbance of the even distribution in the ducts.

In accordance with an advantageous design of the invention, the liquid flow is split in two equal parts at each bisection and the total length of each liquid supply sub-main from the main liquid supply to the respective liquid outlet opening is equal. This ensures the maximum possible total running length for each fluid particle and consequently the maximum possible pressure difference between the liquid supply main inlet and the liquid outlet opening.

A malfunctioning of the liquid distributor due to pressure fluctuations during operation or clogging due to dust particles in areas of low or negligible flow rates is prevented due to the rounded design of the ducts at the bifurcations, following the flow direction.

The ultra low flow liquid distributor in accordance with this invention consists of a base body with a front and a rear side. The base body has a certain thickness and length, which match the mass transfer plate to be moistened. This prevents a disturbance of the gas flow, which is passing the transfer surface. In this base body, a liquid supply system is integrated in such a way, that it branches further and further towards the liquid outlet openings, starting at a common liquid supply main. The liquid, which enters the ultra low flow liquid distributor in accordance with this invention, either continuously or intermittently, is split at each bifurcation into two mass flows of equal size when flowing through this liquid distributor.

In accordance with an advantageous design of this invention, two transfer surfaces can be moistened simultaneously with this ultra low flow liquid distributor.

In accordance with a preferred design of this invention the liquid outlet openings are arranged in a straight line. This supports the generation of an even liquid film.

The formation of droplets when the liquid is discharged at the outlet openings can be prevented by an advantageous design of the invention, where the outlet openings are shaped tapered, with the wider opening pointing outwards.

A mass and heat transfer reactor with such an ultra low flow liquid distributor is almost maintenance free and allows the generation of a very thin and homogenious sorbent film on the mass- and heat transfer surfaces.

Regarding the design of the coating on the mass-and heat transfer surfaces, reference is made to the patent application with the title "Mass and Heat Transfer Surface" which was submitted on the same day, Reference No. P/11ZA0722/DE, in its entirety.

With regard to the design of the mass and heat transfer reactor, reference is also made to the patent application with the title "Mass and Heat Transfer Reactor" which was submitted on the same day, Reference No.: P/11ZA0720/DE in its entirety.

BRIEF DESCRIPTION OF THE DRAWINGS

Further details, characteristics and advantages of the invention result from the following description of preferred designs in accordance with the drawings.

Shown are:

FIG. 3 a front view of the liquid distributor.

FIG. 4a a detail of the rear view of the liquid distributor

FIG. 4b a cross section through FIG. 4a along line D—D;

FIGS. 6 and 7 an alternative design of the liquid distributor; and

FIG. 8 a detail of FIG. 3.

DETAILED DESCRIPTION OF THE PREFERRED EMBODIMENTS

Figure 1:
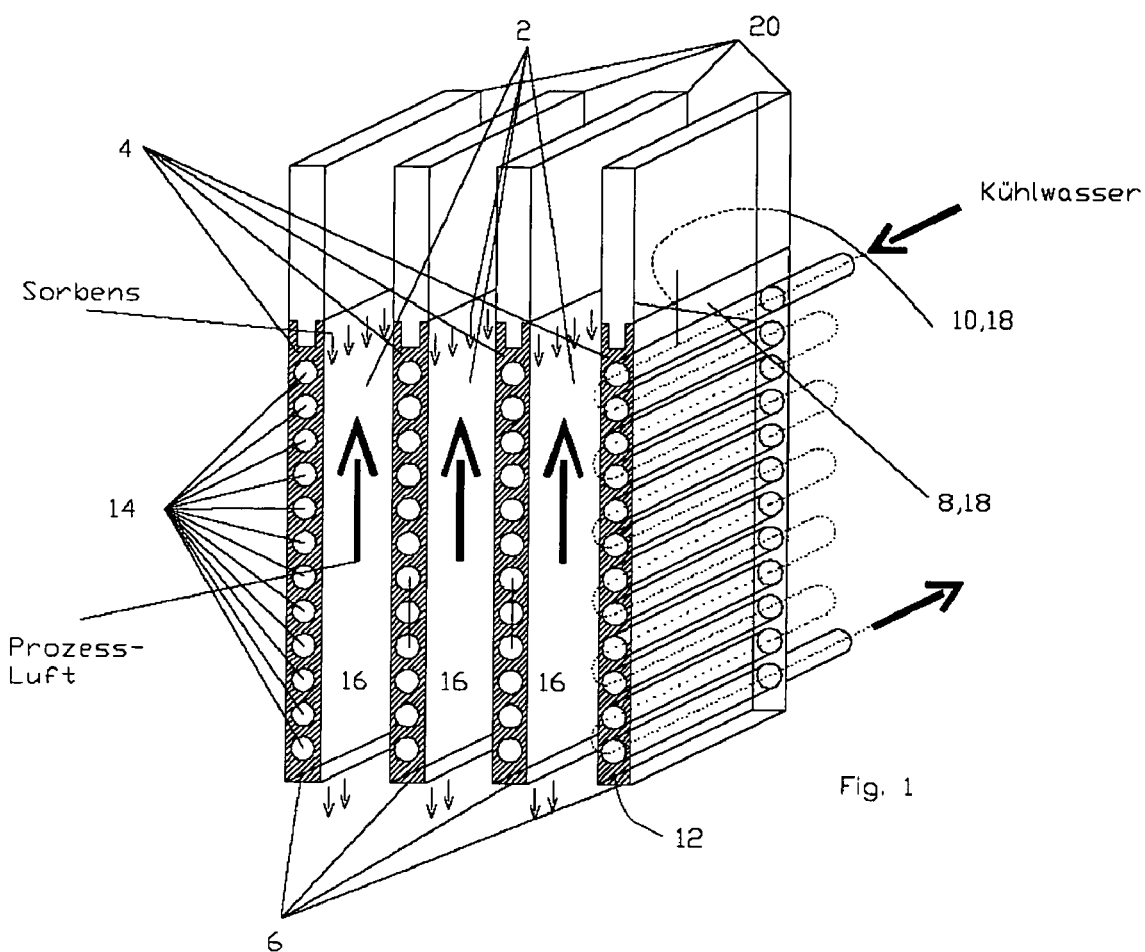
FIG. 1 a schematic drawing of a typical design of the invention

The typical design of the invention shown in FIG. 1 has a multitude of vertical reactor double plates 2, which are arranged side-by-side with some space in-between. Each of the reactor double plates 2 has one upper end 4, one lower end 6, one first and one second main surface 8 and 10 respectively, and a void 12 between first and second main surface 8 and 10. The void 12 is shaped to form a heat transfer duct system 14, in which e.g. water can circulate as a heating or cooling media HKM. Between the individual reactor double plates 2, a mass transfer duct system 16 is formed. The first and second main surfaces 8 and 10 of the reactor double plates 2 are designed as mass and heat transfer surfaces 18. The mass and heat transfer surfaces 18 are moistened continuously from the top by a liquid medium FM or a sorbent. From the bottom, in counter-flow direction, a gaseous medium flows between the reactor double plates, which releases—in case of absorption—a gaseous component into the sorbent FM and absorbs the same gaseous component from the sorbent FM in case of desorption.

At the upper end 4 of the reactor double plates 2, a liquid distributor or ultra low flow liquid distributor 20 is attached, which provides sorbent FM across the entire width of the reactor double plates 2 on all mass and heat transfer surfaces 18 to form a thin film of liquid. Details of the liquid distributor 20 are described in FIGS. 3, 4 and 5.

Figure 2:
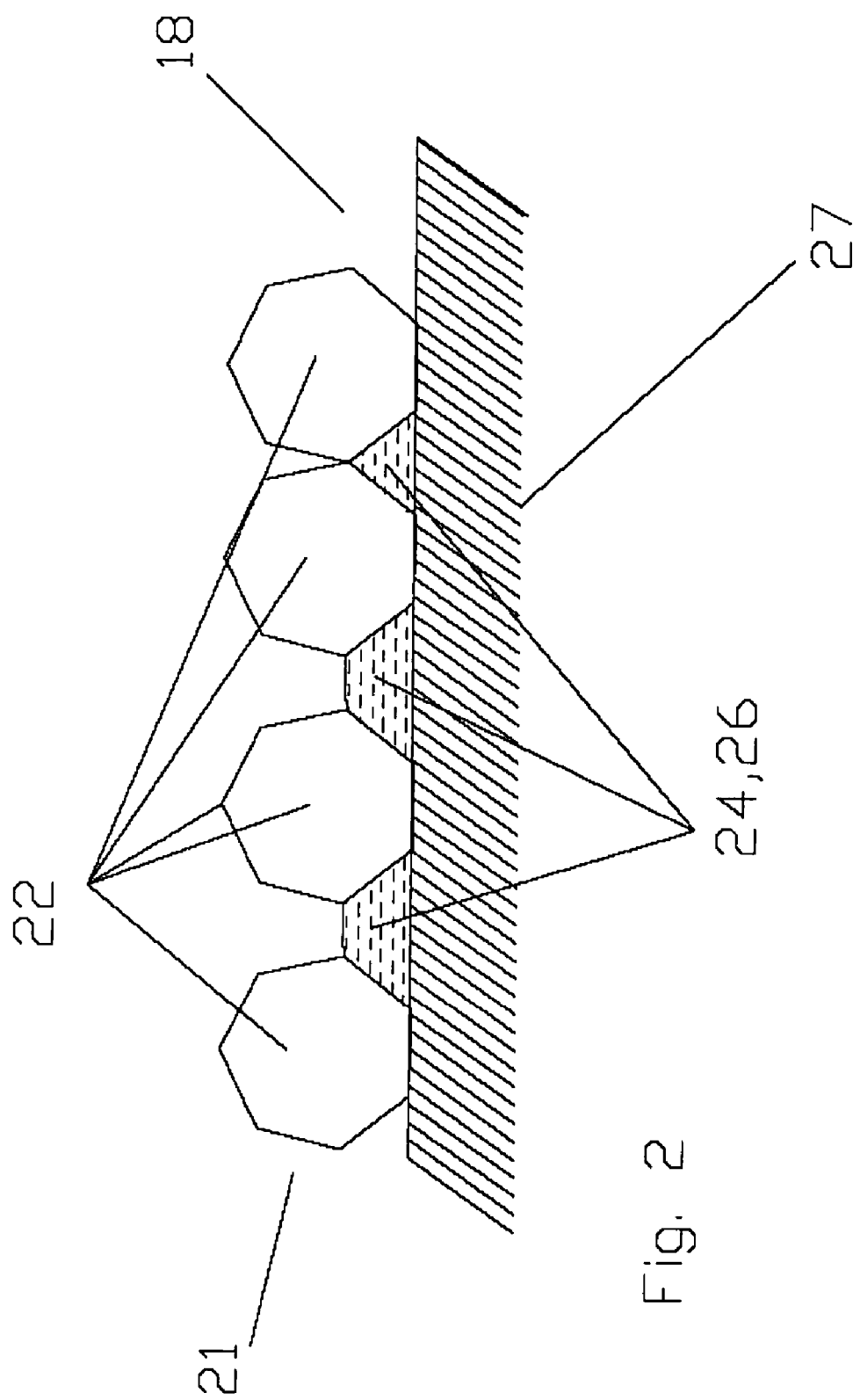
FIG. 2 a schematic cross section though one of the mass and heat transfer surfaces.

The mass and heat transfer surfaces 18 have a coating 21 consisting of small solid particles 22, for example sand grains, as schematically shown in FIG. 2. The mass and heat transfer surfaces 18 thus have a surface like sandpaper. Between the individual solid particles or sand grains 22, respectively gaps and voids 24 are formed. These small gaps and voids 24 by their capillary effect cause the even distribution of sorbent FM in the form of a thin liquid film 26 on the mass and heat transfer surfaces 18. As shown in FIG. 2, the sand grains 22 are applied individually, side-by-side on the mass and heat transfer surfaces 18. This single layer application enables the formation of a very thin film of liquid.

The coating 21 and the sand grains 22, respectively are fixed permanently on the mass and heat transfer surface 18, using glue. Alternatively, the coating can be fixed onto an intermediate carrier, which is not shown, which itself can be fixed onto the mass and heat transfer surfaces 18.

FIG. 3 to 5 show a typical design of a liquid distributor 20, which is used to apply the liquid sorbent FM from the upper end 4 of the reactor double plates 2 onto the mass and heat transfer surfaces 18. The liquid distributor 20 consists of a base body 27 in the form of a rectangular panel with a front side 28 and a rear side 29. The width "b" and thickness "d" of the liquid distributor correspond to the width and thickness of the reactor double plates 2. Along the upper edge of the liquid distributor 20, front and rear liquid outlet openings 30 and 32 are situated at regular intervals side by side, whereby the front and rear openings 30 and 32 are alternating. Therefore the front liquid outlets 30 moisten the front side 28 of the liquid distributor 20 and the first main surface 8 of a reactor double plate 2, while the rear liquid outlet openings 32 moisten the rear side 29 and the second main surface 10.

The liquid outlet openings 30 and 32 receive the liquid or sorbent FM, respectively via a liquid supply system 34. The liquid supply system 34, which is shown on the front side 28, includes a common main supply 36 and a multitude of sub-mains 38. The liquid main supply 36 is branched by repetitive bifurcations 40 into liquid supply sub-mains 38, until one liquid supply sub-main 38 is available for each liquid outlet opening 30 and 32. The design as shown in FIG. 3 has 64 liquid outlet openings 30 leading to the first main surface 8 and 64 liquid outlet openings 32 leading to the second main surface 10. The liquid main supply 36 branches at the first bifurcation 40 into two sub-mains 38, which are split another five times, every time into two sub mains until one individual sub main 38 is available for each of the 128 liquid outlet openings 30 and 32.

The liquid main supply 36 is equipped with a connection pipe 42, which lies above the upper edge of the liquid distributor 20 and serves to feed the liquid sorbent into the system. The liquid main supply 36 ends at the lowest point of the liquid supply system 34 and the liquid supply sub-mains 38 are always directed either horizontally or vertically, pointing upwards against gravity. This arrangement of liquid supply sub mains 38 prevents the formation of gas bubbles in the liquid supply system 34, which could lead to a discontinuous film formation.

Figures 5A, 5B, 5C:
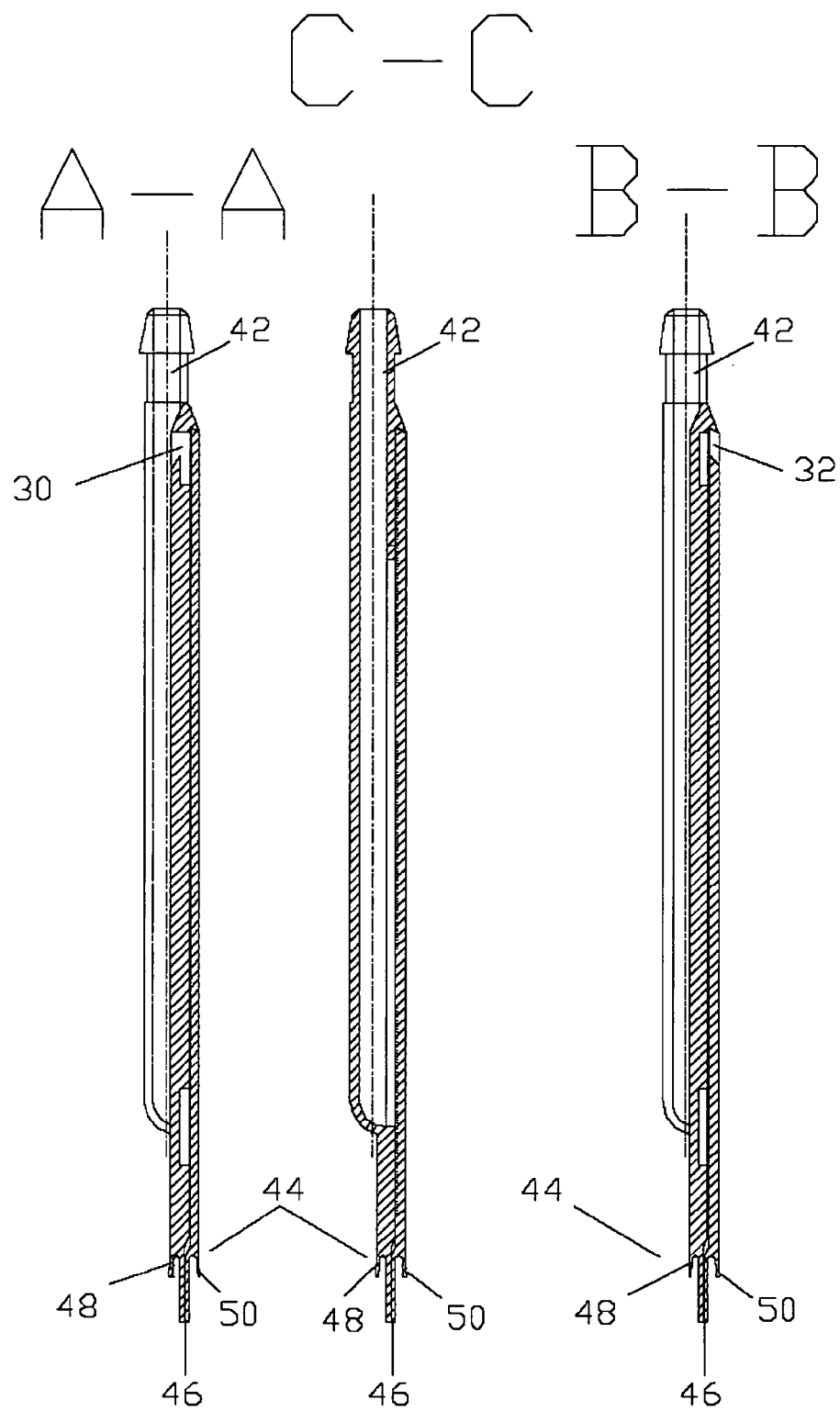
FIGS. 5a, 5b, and 5c are cross sectional views taken along lines A—A, B—B and C—C in FIG. 3.

The details in FIGS. 5a and 5c show that the liquid supply openings 30 and 32 are tapered, with the wider opening pointing outwards. This shape prevents the formation of droplets when liquid sorbent FM leaves the liquid outlet openings 30 and 32 and ensures the continuous moistening of the mass and heat transfer surfaces 18. In the area below the liquid outlet openings 30 and 32, both front side 28 and rear side 29 of the liquid distributor 20, are equipped with the same coating 21 as the mass and heat transfer surfaces 18. This ensures a continuous formation of a liquid film, starting from the liquid outlet openings 30, 32 and reaching to the lower end 6 of the mass and heat transfer surfaces 18.

The liquid distributor 20 is plugged onto the respective reactor double plate 2 with a plug and socket connection 44. The cross section of the plug and socket connection 44 resembles the letter "M", as displayed in FIGS. 5a, 5b and 5c. It is equipped with a center plugging strip 46, which protrudes out of the bottom and left, right, in the front and the rear a front cover strip 48 and a rear cover strip 50. The front cover strip 48 overlaps the first main surface 8 and the rear cover strip 50 overlaps the second main surface 10.

FIGS. 6 and 7 show cross sectional views of alternative designs of the liquid distributor 20. The designs in accordance with FIGS. 6 and 7 are different from the design in accordance with FIG. 5 with regard to the shape of the liquid outlet openings 30 and 32. The front and rear liquid outlet openings 30 and 32 are at the same level and are not staggered sideways, as in the design in accordance with FIG. 5. In the design in accordance with FIG. 6 the liquid supply sub-mains are directly connected with the liquid supply openings 30 and 32 and lead diagonally outwards and upwards to the top. In the design in accordance with FIG. 7 these last liquid supply sub-mains 38 lead horizontally outwards. In the design in accordance with FIG. 7 the bifurcation 40 is rounded off to prevent turbulence and irregularities in the flow speed.

FIG. 8 shows a detail of FIG. 3 with rounded bifurcations 40. At the bifurcations 40 the liquid supply sub-mains are provided with a wedge-shaped bulge, which complements the rounded form of the bifurcation.

To prevent the clogging of the smallest liquid supply sub-mains, the minimum cross section of the liquid supply sub-mains 38 is designed to be twice the size of the largest expected dust particle (typically 1 mm$^2$).

The ultra low flow liquid distributor as described above is particularly suitable for use in a mass and heat transfer reactor for the dehumidification and cooling of air. The air is dehumidified by means of a sorbent while at the same time the absorbing liquid, usually a watery salt solution containing one or several salts, is considerably diluted (absorption). Alternatively the air is humidified and the sorbens re-concentrated (Desorption). The heating and cooling liquid, which circulates in the heat transfer duct system 14 separated from the liquid sorbent FM and the air GM, transfers heat into or out of the sorption process (Desorption or Absorption). To achieve the maximum possible cooling water temperature difference for absorption the cooling water HKM is ducted in counter-flow or cross-counter-flow direction to the airflow. For desorption it is ducted counter flow or cross-counter flow direction to the sorbent (FM). For absorption the most concentrated sorbent will be cooled the most, which keeps the vapour pressure equilibrium for the sorbent as low as possible. For the desorption the most concentrated sorbent is brought in contact with the hottest heat medium HKM, which causes the highest possible increase in vapour pressure equilibrium in the sorbent. Both measures provide the greatest possible mass transfer potential for the respective process (Absorption or Desorption).

The mass and heat transfer surfaces 18, which separate the sorbent FM and the air GM from the cooling and heating agent HKM, at the void 12 between the reactor double plates 2 are in complete contact with the heating and cooling media HKM and the other side, i.e. the mass and heat transfer surfaces 18 are moistened with the liquid sorbent FM. The liquid sorbent FM forms an extremely thin, continuous film 26 on the mass and heat transfer surfaces 18, which flows down the mass and heat transfer surfaces 18, following gravity. Due to the pure contact with liquids, on the inner side as well as on the outer side of the reactor double plates 2, a high heat transfer coefficient and consequently a high heat transfer rate is achieved regarding the heat transfer from the heating and cooling liquid HKM through the separating wall into the sorbent FM and to the air GM, which flows along the thin film of sorbent 26. This also ensures an optimal mass transfer. The continuous sorbent film 26 is achieved by use of a special coating 21 consisting of small solid particles 22, which enables an extremely small amount of sorbent to form a continuous moist surface on the mass and heat transfer surfaces 18 and which runs continuously to the bottom. The extremely small amount of sorbent is distributed by the liquid distributor 20 across the upper edge of the mass and heat transfer surfaces 18 over the entire width of the reactor double plate 2, without forming droplets, which could be carried out by the airflow. The liquid distributor 20 does not or only minimally protrude into the free cross section for the airflow between the reactor double plates 2, so that no significant disturbance of the airflow occurs, which would lead to an increased pressure loss.

The entire the mass and heat transfer reactor can be manufactured in plastic (Polymers) and can be designed very thin. The thickness of the individual reactor double plates 2 for example is 3 mm. In the void 12 between the reactor double plates 2 fins (not shown) are inserted at regular intervals, so that the cooling liquid HKM flows through in the form of a meander. In the mass transfer duct system 16, which is formed between the reactor double plates 2, air GM flows against gravity while liquid sorbent FM flows with gravity, forming a direct, continuous counter flow.

What is claimed is:

1. An ultra low flow liquid distributor for minimum amounts of liquids for generating a thin liquid film on a transfer surface, said transfer surface providing direct contact between gas in a gas volume and the liquid in said thin liquid film, said ultra low flow liquid distributor comprising:
   an even number of liquid outlet openings into said gas volume which are arranged along said transfer surface, which is to be moistened,
   a liquid supply system starting from a common main supply, which is branched by repetitive bisection at bifurcations into a multitude of liquid supply sub-mains, until each liquid supply sub-main feeds into one of said liquid outlet openings,
   wherein said liquid supply sub-mains are arranged below the liquid outlet openings.

2. The ultra low flow liquid distributor in accordance with claim 1, wherein said outlet openings are spaced at equal intervals.

3. The ultra low flow liquid distributor in accordance with claim 1, wherein said liquid supply sub-mains are arranged solely in such a way that the liquid flow is flowing against gravity from the bottom to the top or across, perpendicular to gravity.

4. The ultra low flow liquid distributor in accordance with claim 1, wherein
   the cross sections of said liquid supply sub-mains is halved at each bifurcation, and
   the total length of each individual liquid supply sub-main from the main liquid supply to the respective liquid outlet opening is equal.

5. The ultra low flow liquid distributor in accordance claim 1, wherein said liquid supply sub-mains are of a rounded shape at the bifurcations.

6. The ultra low flow liquid distributor in accordance with claim 1, comprising an attachment device for attaching the ultra low flow liquid distributor at the transfer surface.

7. The ultra low flow liquid distributor in accordance with claim 1, comprising a base body in shape of a panel with a front side and a rear side, wherein the liquid outlet openings are arranged in the upper section of the panel shaped base body.

8. The ultra low flow liquid distributor in accordance with claim 7, wherein immediately neighboring liquid outlet openings are alternately fed to the front side and to the rear side.

9. The ultra low flow liquid distributor in accordance with claim 1, wherein said liquid outlet openings are arranged in a straight line.

10. The ultra low flow liquid distributor in accordance with claim 1, wherein the liquid outlet openings are shaped conically, opening outwards.

11. A mass and heat transfer reactor, comprising:
two duct systems, which are isolated from each other with regard to the mass flow, but are coupled with regard to the heat transfer, whereby there is a flow of a liquid or gaseous heating or cooling media in one duct system and in the other duct system a flow of a gaseous media and a further liquid media;
at least one mainly vertically arranged reactor double plate with one upper end and one lower end, a primary and a secondary main surface and a void between said primary and secondary main surfaces; wherein
a heat transfer duct system is accommodated in the void,
at least one of the main surfaces is designed to serve as a mass and heat transfer surface,
said at least one mass and heat transfer surface is coated with a material to reduce the surface tension and/or has a surface structure which reduces the surface tension,
at said mass and heat transfer surface the gaseous media and the liquid media are ducted in such a way as to establish a counter flow,
at the upper end of said at least one reactor double plate, a liquid distribution system is connected in such a way as to establish a thin film of moisture of the liquid media on said at least one mass and heat transfer surface, and
said liquid distribution system is an ultra low flow liquid distributor in accordance with claim 1.

12. The ultra low flow liquid distributor in accordance with claim 1, wherein each of said bifurcations comprises a wedge-shaped bulge being symmetrically arranged with respect to the liquid streaming through each of said bifurcations.

* * * * *